3,702,855
OLEFIN EPOXIDATION
Charles S. Bell, Berkeley, and Harald P. Wulff, Alameda, Calif., assignors to Shell Oil Company, New York, N.Y.
No Drawing. Filed June 26, 1970, Ser. No. 50,311
Int. Cl. C07d 1/08, 1/12
U.S. Cl. 260—348.5 L                    6 Claims

ABSTRACT OF THE DISCLOSURE

Olefin oxides are produced by the reaction of an organic hydroperoxide and an olefinically unsaturated compound in the presence of a catalyst selected from a metal silicide of Ti, Zr, V, Nb, Cr, Mo and W.

BACKGROUND OF THE INVENTION

The use of organic hydroperoxides in the epoxidation of olefins is known to offer important and distinct advantages over other methods of olefin oxide production. Organic hydroperoxides are relatively inexpensive and convenient and safe to handle. In addition, organic hydroperoxides can readily be obtained and maintained in anhydrous form, thus minimizing potential olefin oxide recovery and purification problems. Also, during the epoxidation reaction, the organic hydroperoxide is converted to other valuable products.

A variety of catalysts has been employed for the reaction of olefins with hydroperoxides. One process is that of Smith, U.S. 2,754,325 issued July 10, 1956, wherein soluble heteropoly acids containing transition metals such as chromium, molybdenum, and tungsten are employed as homogeneous catalysts for the reaction of olefins and peroxides such as organic hydroperoxides and hydrogen peroxide. More recently, U.S. 3,350,422 and U.S. 3,351,-635, issued Oct. 31, 1967, and Nov. 7, 1967, respectively, to Kollar describe the use of solutions of transition metal compounds (V, Mo, W, Ti, Nb, Ta, Re, Se, Zr, Te and U) as homogeneous catalysts. Although sufficiently soluble compounds of these transition metals generally may be suitable as homogeneous catalysts, their commonly available insoluble compounds, especially inorganic, in general are ineffective as catalysts. For example, U.S. 3,350,422 discloses that epoxidation of propylene with cumene hydroperoxide employing insoluble vanadium pentoxide as catalyst results in a propylene oxide yield (6%) which is little better than that obtained with no catalyst (4%). Similarly, inorganic compounds, particularly the oxides, of the metals disclosed in U.S. 3,351,635, are generally ineffective as catalysts. For example, copending U.S. Ser. No. 812,920 of Wulff et al., common assignee, filed Apr. 2, 1969, discloses that when either $TiO_2$, $ZrO_2$, $Ta_2O_5$, $CrO_3$, $WO_3$, $Re_2O_7$, $TeO_2$, $SeO_2$, or $UO_2$ is employed as the catalyst for the epoxidation of 1-octene with t-butyl hydroperoxide, the selectivity to 1-octene oxide based on converted hydroperoxide ranges from 0 to 22%.

SUMMARY OF THE INVENTION

It has now been found that improved expoxidation of olefinically unsaturated compounds with organic hydroperoxides is effected with a silicide of titanium, zirconium, vanadium, niobium, chromium, molybdenum or tungsten as catalyst. The metal silicide catalyst is characterized by being essentially insoluble in the epoxidation reaction mixture providing a heterogeneous system.

DESCRIPTION OF PREFERRED EMBODIMENTS

The catalyst

The catalyst employed for the epoxidation is an inorganic metal silicide of Ti, Zr, V, Nb, Cr, Mo or W. Metal silicides are prepared by conventional methods, e.g., as by heating a metal and silicon at elevated temperatures, and many metal silicides are commercially available. Illustrative of suitable metal silicides are mono-, di-, and trisilicides such as TiSi, $TiSi_2$, $TiSi_3$, $Ti_3Si$, $Ti_5Si_3$, ZrSi, $ZrSi_2$, $Zr_3Si$, $Zr_2Si$, $Zr_3Si_2$, $V_3Si$, $VSi_2$, $NbSi_2$, $Nb_3Si$, $Cr_3Si_2$, MoSi, $MoSi_2$, $W_5Si_3$ and $WSi_2$. Largely because of lower cost and availability, preferred metal silicides are titanium silicides.

The epoxidation process is characterized by the requirement for only catalytic quantities of the metal silicide. However, amounts of metal silicide based on organic hydroperoxide from about 0.01% by weight to 200% by weight can be employed, although amounts of metal silicide from about 0.1% to about 10% by weight on the same basis are preferred.

The olefinic reactant

The proces of the invention is generally applicable to the epoxidation of any organic compound having at least one aliphatic, olefinically unsaturated carbon-carbon double bond, and generally of from 2 to 60 carbon atoms, but preferably of from 2 to 30 carbon atoms. The olefinic reactant is an acyclic, a monocyclic, a bicyclic or a polycyclic olefin and is a monoolefin, diolefin, or polyolefin. The olefinic linkages of diolefins and polyolefiins are either conjugated or non-conjugated. The olefinic reactant preferably is hydrocarbon containing only atoms of carbon and hydrogen, but it can be a substituted-hydrocarbon additionally containing relatively stable functional groups incorporating atoms such as oxygen, halogen and nitrogen.

Preferred as olefinic reactants are (a) hydrocarbon monoolefins of from 2 to 10 carbon atoms such as propylene, isobutylene, hexene-3, octene-1, and decene-1; (b) monocyclic monoolefins such as cyclopentene, cyclohexene, methylenecyclohexane, and allyl benzene; and (c) oxygen-containing substituted hydrocarbon olefins such as allyl and crotyl alcohols, diallyl and phenyl allyl ether, ethyl methacrylate, allyl acetate, crotonaldehyde, and soy bean and corn oils.

The organic hydroperoxide

The process of the invention is broadly applicable to the use of any organic compound having at least one hydroperoxide moiety, but free of functional groups which are normally reactive with hydroperoxide. One suitable class of organic hydroperoxides having from 3 to 20 carbon atoms is represented by Formula I

    R'OOH                    (I)

where R' is a hydrocarbyl group or a substituted-hydrocarbyl group additionally containing halogens of atomic number 7 to 53 inclusive, e.g., fluorine, chlorine, bromine and iodine, and oxygen incorporated into functional groups such as hydroxy, hydrocarbyloxy, hydrocarboyl, hydrocarbyloxycarbonyl, hydrocarboyloxy, and the like.

Hydrocarbon hydroperoxides of from 3 to 20 carbon atoms are preferred for use in the process of the invention. Particularly preferred hydrocarbon hydroperoxides are secondary and tertiary hydroperoxides of up to 10 carbon atoms, especially tertiary alkyl hydroperoxides, such as tertiary butyl hydroperoxides and tertiary amyl hydroperoxides, and secondary and tertiary aralkyl hydroperoxides wherein the hydroperoxy group is on a carbon atom attached directly to an aromatic ring, such as α-methylbenzyl hydroperoxide, cumene hydroperoxide, and tetralin hydroperoxide.

The organic hydroperoxide may be prepared by passing an oxygen-containing gas through the corresponding hydrocarbon until at least a portion of said hydrocarbon is converted to the hydroperoxide. Organic hydroperoxide so produced may be supplied to the epoxidation reaction as a dilute or concentration solution, generally 5 to 70% by weight in its hydrocarbon precursor, and in a purified or unpurified form.

In the epoxidation reaction, the molar ratio of olefinic reactant to hydroperoxide can vary over a wide range and a molar excess of either the olefinic reactant or hydroperoxide of up to as high as 100:1 can be used. In general, molar ratios of olefinic reactant to hydroperoxide varying from about 50:1 to about 1:10 are satisfactory, although it is preferred to employ molar ratios of olefinic reactant to hydroperoxide of about 20:1 to about 1:1.

The reaction conditions

The process of the invention is conducted in the liquid phase in solvents or diluents which are liquid at reaction temperature and pressure and are substantially inert to the reactants and the products produced therefrom.

Preferred solvents are mononuclear aromatics such as benzene, toluene, chlorobenzene, o-dichlorobenzene; and alkanes such as octane, decane, and dodecane. In certain modifications of the epoxidation process, a portion of the olefinic reactant serves as the reaction solvent and no added solvent is needed. In most instances, however, added solvent is used and amounts up to about 20 moles of solvent per mole of organic hydroperoxide are satisfactory. The process is preferably conducted in an inert reaction environment so that the presence of reactive materials such as water is desirably avoided. Suitable reactions are therefore substantially anhydrous.

The precise method of conducting the epoxidation process is not critical. In one modification, the olefin, the hydroperoxide, the catalyst and any solvent which is employed are charged to an autoclave or similar reactor and maintained at reaction conditions for the desired reaction period. In another modification, epoxidation is effected in a continuous manner as by passing the olefin and the hydroperoxide in liquid phase solution through a reactor in which the catalyst is maintained. By any modification, the epoxidation process is conducted at moderate temperatures and pressures. Suitable reaction temperatures vary from about 0° C. to about 200° C., but preferably from 25° C. to 200° C. The reaction is conducted at or above atmospheric pressure. The precise pressure is not critical so long as the reaction mixture is maintained substantially in a non-gaseous phase. Typical pressures vary from about 1 atmosphere to about 100 atmospheres.

At the conclusion of the reaction, the product mixture is separated and the products are recovered by conventional methods such as fractional distillation, selective extraction, filtration and the like. The reaction solvent, the catalyst and any unreacted olefin or hydroperoxide are recycled for further utilization.

The products

According to the process of the invention, the olefinic reactant is epoxidized to the corresponding olefin oxide. By way of illustration, propylene oxide is produced from propylene.

The olefin oxide products are materials of established utility and many are chemicals of commerce. For example, propylene oxide, an illustrative olefin oxide which is readily prepared by the process of the invention is formulated into useful polymers by polymerization or copolymerization as disclosed by U.S. Pat. 2,815,343, 2,871,219 and 2,987,489. Propylene oxide is currently prepared commercially by the classic chlorohydrin process.

According to the process of the invention the organic hydroperoxide is converted to the corresponding alcohol. The alcohol can be recovered as a co-product of the process or reconverted to the hydroperoxide by procedures such as dehydration to olefin, hydrogenation of the olefin and oxidation to hydroperoxide, or by hydrogenolysis to hydrocarbon followed by oxidation to hydroperoxide.

EXAMPLES 1 TO 9

In a series of experiments the epoxidation of 1-octene with t-butyl hydroperoxide was conducted in the presence of a variety of commercial metal silicides. Each experiment was conducted by charging 1 g. of the indicated metal silicide, 36 g. of 1-octene, 4.5 g. of t-butyl hydroperoxide and 2.1 g. of nonane diluent to a 100 ml. glass reactor and maintaining the reaction mixture under reflux (100°–110° C.) for the indicated reaction period. The metal silicide employed, reaction time, the hydroperoxide conversion and the selectivity to 1-octene oxide based on converted hydroperoxide are provided in Table I.

TABLE I

| Example | Metal silicide | Reaction time, hours | Hydroperoxide conversion, percent | Epoxide selectivity, percent |
|---|---|---|---|---|
| 1 | TiSi$_2$ | 3.5 | 73.4 | 96 |
| 2 | TiSi$_2$ | 6.75 | 59.1 | 84.5 |
| 3 | ZrSi$_2$ | 19.5 | 64 | 42 |
| 4 | VSi$_2$ | 3.75 | 50 | 87 |
| 5 | NbSi$_2$ | 19 | 80 | 80 |
| 6 | Cr$_3$Si$_2$ | 7 | 46 | 70 |
| 7 | MoSi$_2$ | 0.5 | 94 | 100 |
| 8 | MoSi | 2 | 61 | 94 |
| 9 | WSi$_2$ | 11.5 | 45 | 75 |

EXAMPLES 10 TO 23

In a series of experiments the epoxidation of 1-octene with t-butyl hydroperoxide was conducted in the presence of a variety of inorganic titanium compounds. Each experiment was conducted by charging 1 g. of the indicated titanium compound, 36.5–42 g. of 1-octene, 4.5–5.5 g. of t-butyl hydroperoxide (TBHP) and 0–2.1 g. of nonane diluent to a 100 ml. glass reactor and maintaining the reaction mixture under reflux (100°–110° C.) for the indicated reaction period. The titanium compound employed, the amount of 1-octene, t-butyl hydroperoxide and nonane diluent employed, the hydroperoxide conversion and the selectivity to 1-octene oxide based on converted hydroperoxide are provided in Table II.

EXAMPLE 24

By a procedure similar to that employed in Examples 1–9, a sample of 4-cyanocyclohexene is reacted with ethylbenzene hydroperoxide in the presence of titanium disilicide as catalyst. Analysis of the reaction mixture shows a good yield of 4-cyanocyclohexene oxide.

EXAMPLE 25

By a procedure similar to that employed in Examples 1–9, a sample of 4-chlorocylohexene is reacted with ethylbenzene hydroperoxide in the presence of vanadium disilicide as catalyst. Analysis of the reaction mixture shows a good yield of 4-chlorocyclohexene oxide.

EXAMPLE 26

By a procedure similar to that employed in Examples 1–9, a sample of allyl alcohol is reacted with t-butyl hydroperoxide in the presence of $WSi_2$ as catalyst. Analysis of the reaction mixture shows a good yield of glycidol.

TABLE II

| Example | Compound | Octene-1, g. | TBHP, g. | Nonane, g. | Reaction time, hrs. | Hydroperoxide conv., percent | Epoxide sel., percent |
|---|---|---|---|---|---|---|---|
| 10 | $TiO(HPO_4)$ | 42 | 5.5 | 0 | 4 | 20 | 4 |
| 11 | $Bi_2Ti_2O_7$ | 42 | 5.5 | 0 | 4 | 48 | 6 |
| 12 | $TiB_2$ | 42 | 5.5 | 0 | 4 | 17 | 2 |
| 13 | $TiNaSiO_3$ | 36.5 | 4.5 | 2.1 | 6.25 | 1.7 | 0 |
| 14 | TiN | 36.5 | 4.5 | 2.1 | 21 | 41 | 36 |
| 15 | $TiSe_2$ | 36.5 | 4.5 | 2.1 | 0.5 | 93.8 | 6.3 |
| 16 | $TiS_2$ | 36.5 | 4.5 | 2.1 | 2.1 | 99.3 | 0 |
| 17 | $Ti_2(SO_4)_3$ | 36.5 | 4.5 | 2.1 | 21.2 | 95.3 | 0 |
| 18 | TiO | 36.5 | 4.5 | 2.1 | 7.5 | 15.8 | 22 |
| 19 | $TiO_2$ (fumed) | 36.5 | 4.5 | 2.1 | 20 | 53.1 | 3.7 |
| 20 | $Ti_2O_3$ | 36.5 | 4.5 | 2.1 | 17 | 35.2 | 29.9 |
| 21 | $MgTiO_3$ | 36.5 | 4.5 | 2.1 | 12 | 27.5 | 0 |
| 22 | $SrTiO_3$ | 36.5 | 4.5 | 2.1 | 16 | 35.0 | 0 |
| 23 | $CaTiO_3$ | 36.5 | 4.5 | 2.1 | 16 | 28 | 0 |

We claim as our invention:

1. A process for epoxidizing an alkene of from 3 to 40 carbon atoms with an organic hydroperoxide having 3 to 20 carbon atoms and selected from tertiary alkyl hydroperoxides and aralkyl hydroperoxides wherein the hydroperoxy group is on a carbon atom attached directly to an aromatic ring, by contacting a mixture of them with a metal silicide of Ti or Zr as catalyst, in liquid phase in inert solvent at a temperature of from about 25° C. to about 200° C.

2. The process of claim 1 wherein the catalyst is a metal silicide of Ti.

3. The process of claim 2 wherein the metal silicide is $TiSi_2$.

4. The process of claim 2 wherein the alkene is 1-octene and the hydroperoxide is t-butyl hydroperoxide.

5. A process for epoxidizing an alkene of from 3 to 40 carbon atoms with an organic hydroperoxide having 3 to 20 carbon atoms and selected from tertiary alkyl hydroperoxides and aralkyl hydroperoxides wherein the hydroperoxy group is on a carbon atom attached directly to an aromatic ring, by contacting a mixture of them with a metal silicide of Nb as catalyst, in liquid phase in inert solvent at a temperature of from about 25° C. to about 200° C.

6. A process for epoxidizing an alkene of from 3 to 40 carbon atoms with an organic hydroperoxide having 3 to 20 carbon atoms and selected from tertiary alkyl hydroperoxides and aralkyl hydroperoxides wherein the hydroperoxy group is on a carbon atom attached directly to an aromatic ring, by contacting a mixture of them with a metal silicide of Cr as catalyst, in liquid phase in inert solvent at a temperature of from about 25° C. to about 200° C.

References Cited

UNITED STATES PATENTS 3,489,775   1/1970   de Roch et al. _____ 260—348.5

FOREIGN PATENTS 1550166   11/1968   France _____ 260—348.5 L
6707469   12/1967   Netherlands _____ 260—348.5 L NORMA S. MILESTONE, Primary Examiner